F. L. STUART.
CONVEYING SYSTEM.
APPLICATION FILED OCT. 2, 1919.

1,331,883.

Patented Feb. 24, 1920.
2 SHEETS—SHEET 1.

INVENTOR
Francis Lee Stuart.
BY HIS ATTORNEYS.

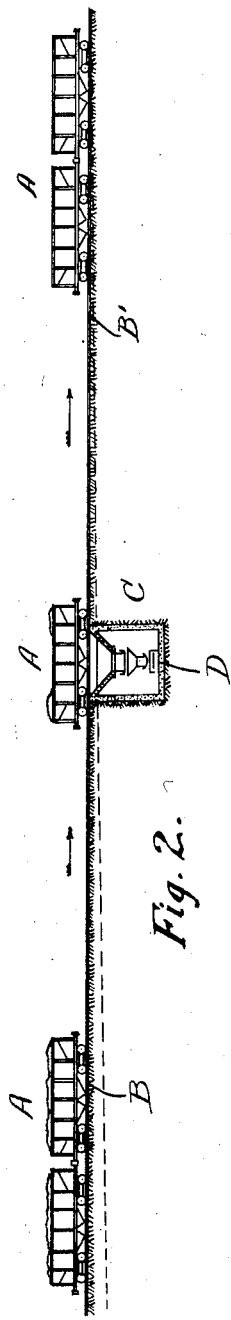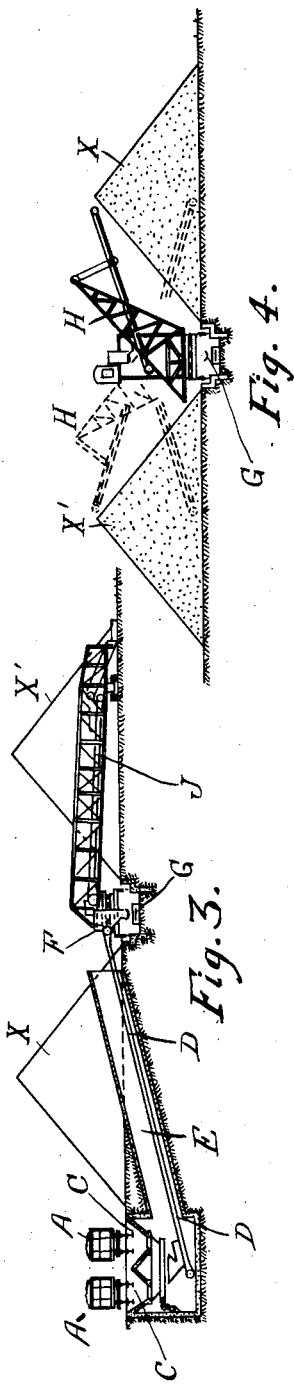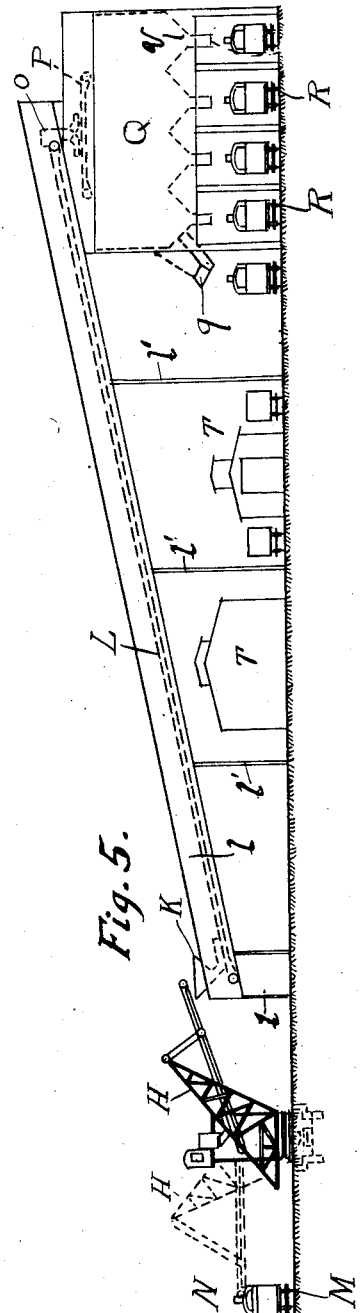

UNITED STATES PATENT OFFICE.

FRANCIS LEE STUART, OF NEW YORK, N. Y.

CONVEYING SYSTEM.

1,331,883.  Specification of Letters Patent.  Patented Feb. 24, 1920.

Application filed October 2, 1919. Serial No. 327,901.

*To all whom it may concern:*

Be it known that I, FRANCIS LEE STUART, a citizen of the United States, residing in New York, county of New York, and State of New York, have invented certain new and useful Improvements in Conveying Systems, of which the following is a specification.

This invention relates to conveying systems in which material, such as coal, is received from carriers, such as railway cars, and conveyed to places for storage, where it is delivered and from which it may be taken for loading other conveyers, carriers, or other receptacles.

The particular object of my present invention is to provide a system in which the conveyers, the apparatus for delivering the material from the conveyers and storing it and for reclaiming or receiving the material from storage may be so organized as to perform these operations when applied to a complicated system of tracks, store-houses, etc., in a yard or plant, where locomotive cars, etc., are located and travel in various directions.

The accompanying drawings show a system embodying my improvements as applied to a plant or yard containing a multiplicity of tracks, sheds, etc.

Fig. 2 shows a section on line 2—2 of Fig. 1.

Fig. 3 shows a section on line 3—3 of Fig. 1.

Fig. 4 shows a section on the line 4—4 of Fig. 1, and

Fig. 5 shows a section on line 5—5 of Fig. 1.

Figure 1:
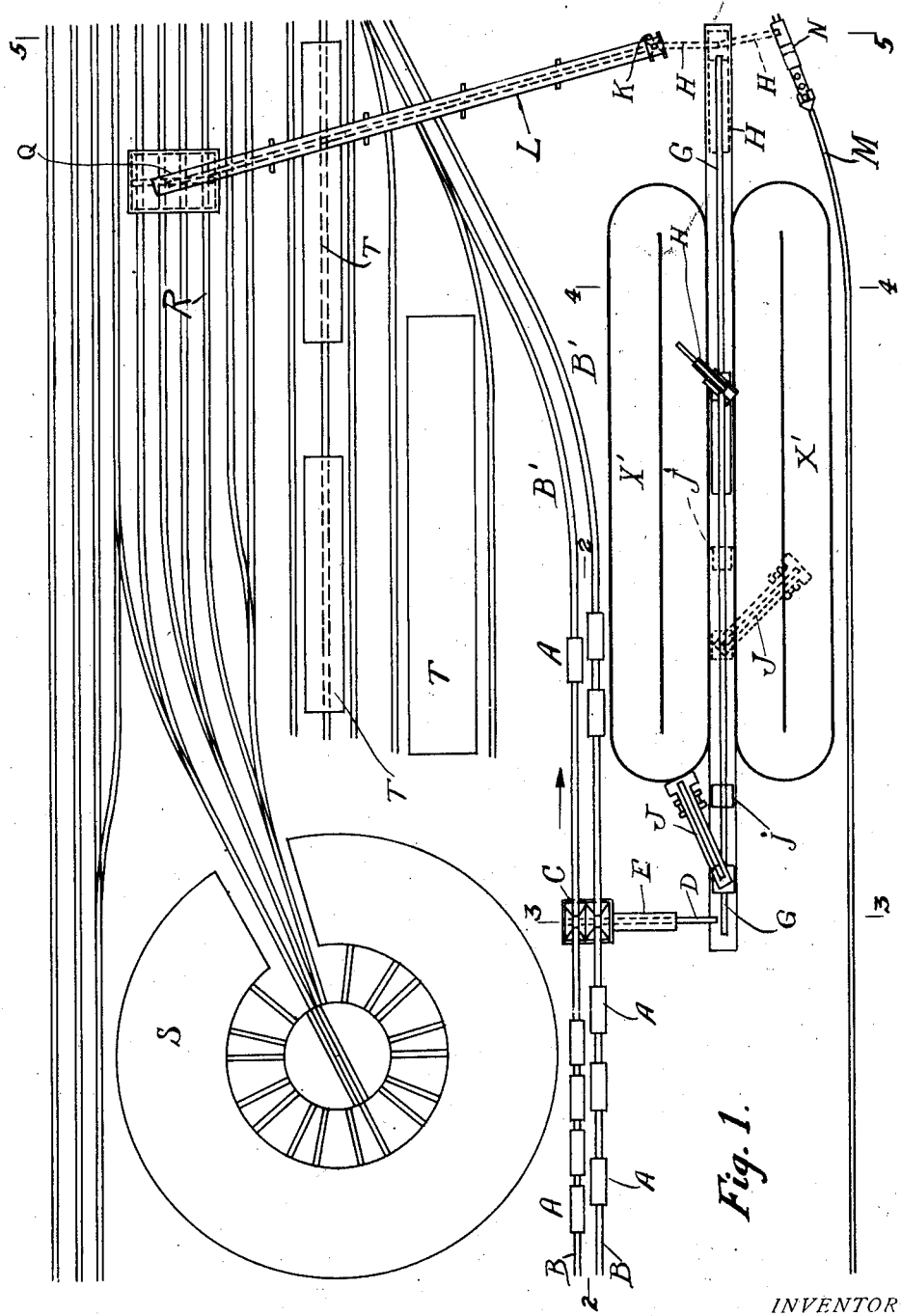
Figure 1 is a diagrammatic plan view of such a plant.

In Fig. 1, A indicates cars on tracks B delivering to a track hopper C and passing out on tracks B'. The hopper C delivers to a conveyer belt D (Fig. 2) contained in a housing E and which in turn discharges through a hopper F onto a main conveyer belt G over which travels a stacker or delivering apparatus H (Fig. 4) which may be of any suitable construction. By means of this apparatus the material may be piled as indicated at X, X', Fig. 1, on each side of the belt G.

J indicates a reclaimer or apparatus for gathering material from the piles X, X' and delivering it to the belt G. This reclaimer may also be of any suitable construction. It may be moved over the belt G and gather material from either of the piles X, X'. *j* indicates a transfer car for supporting the outer end of the reclaimer when being shifted.

Material received from the belt D or from the reclaimer by the belt G is carried to the stacker which delivers it to the places for storage on opposite sides of the belt to form the piles X, X', or the stacker, as indicated by dotted lines in Fig. 1, may deliver to a hopper K (Fig. 5) which discharges onto a conveyer belt L, but it may deliver to a locomotive car or other carrier N on a track M.

The conveyer L is contained in a housing *l*, held in an elevated position by supports *l'*, and extends over tracks and spaces which it is desired to keep clear. The housing is inclined upward from its receiving end to its delivery end and the conveyer L discharges through a hopper O onto a belt P, which delivers to a bin or bins Q having discharge chutes *q* arranged above the tracks R which lead to a locomotive round house S. Locomotives may be transferred from the round house on the tracks R to positions beneath the bins Q and receive coal therefrom, or they may pass by the bins on other tracks, as indicated in Fig. 1.

Sheds or buildings T are disposed between some of the tracks, but the tracks leading to these buildings or passing by their side extend under the elevated conveyer L which in no way interfere with the free movement of the locomotives or cars passing into or out of the yard.

It will thus be seen that coal or other material may be brought into the plant and this material may be stored in the open or it may be delivered to a storage bin adapted to readily supply or fill cars or other carriers passing beneath it, and it will also be observed that the material may be delivered to locomotives or other carriers running on tracks adjacent the stacker, while the bin or bins may be located at a considerable distance from the stacker, while the elevated carrier which conveys the material from the stacker to the bin passes over tracks and spaces which it is desirable to keep clear.

Large quantities of material may be expeditiously handled in this way with but little manual labor. There need be no failure of supply inasmuch as ordinarily locomotives are supplied from the bin or bins which may be kept full by supplies taken directly from incoming coal cars, but should cars fail to arrive, the storage piles may be drawn on to keep the bins supplied. The apparatus for receiving and discharging the material may be located in a part of the plant which is not as active as another part where locomotives and cars are coming and going constantly, and provision is made for bridging the tracks on which said locomotives and cars travel so that they may be moved in and out freely.

I claim as my invention:—

A conveying system, comprising a track hopper for receiving material from cars, a conveyer which receives material from the hopper, a main conveyer belt to which said first mentioned conveyer delivers and which has a storage space beside it, means for gathering material from the storage space and delivering it to the main conveyer belt, apparatus associated with the main conveyer belt for delivering material to said storage space, an elevated storage bin having tracks beneath it for supporting locomotives, cars, etc., an elevated conveyer delivering to said storage bin and which receives material from said delivering apparatus, and tracks for cars, locomotive, etc. extending beneath said elevated conveyer, the organization being such that material such as coal may be received and delivered either to the storage space or to the bin which may also be supplied by material gathered from said storage space while locomotives and cars may pass freely under the bin and under the elevated conveyer in either direction.

In testimony whereof, I have hereunto subscribed my name.

FRANCIS LEE STUART.